(12) United States Patent
Wray et al.

(10) Patent No.: US 7,131,036 B2
(45) Date of Patent: Oct. 31, 2006

(54) METHOD OF DETECTING MALICIOUS CODE

(75) Inventors: Stuart C Wray, Broadstone (GB); Icarus W. J. Sparry, San Jose, CA (US)

(73) Assignee: Marconi UK Intellectual Property Ltd., Coventry (GB)

( * ) Notice: Subject to any disclaimer, the term of this patent is extended or adjusted under 35 U.S.C. 154(b) by 497 days.

(21) Appl. No.: 10/312,303

(22) PCT Filed: Jul. 2, 2001

(86) PCT No.: PCT/GB01/02955

§ 371 (c)(1),
(2), (4) Date: Apr. 9, 2003

(87) PCT Pub. No.: WO02/03175

PCT Pub. Date: Jan. 10, 2002

(65) Prior Publication Data

US 2003/0159090 A1    Aug. 21, 2003

(30) Foreign Application Priority Data

Jul. 1, 2000   (GB) ................................ 0016273.5

(51) Int. Cl.
    *G06F 11/00* (2006.01)
(52) U.S. Cl. ............................ 714/38; 713/188; 726/24
(58) Field of Classification Search .................. 714/38, 714/52
See application file for complete search history.

(56) References Cited

U.S. PATENT DOCUMENTS 5,050,212 A * 9/1991 Dyson ......................... 713/187
5,454,000 A * 9/1995 Dorfman ....................... 714/54
5,475,625 A   12/1995 Glaschick
5,493,649 A * 2/1996 Slivka et al. .................. 714/48
5,598,530 A * 1/1997 Nagae .......................... 714/21
5,608,801 A * 3/1997 Aiello et al. .................. 380/46

(Continued)

FOREIGN PATENT DOCUMENTS

EP    0 848 316 A2   12/1997

(Continued)

OTHER PUBLICATIONS

*System For Detecting Undesired Alteration Of Software*, IBM Technical Disclosure Bulletin, IBM Corp., New York, vol. 32, No.11, Apr. 1, 1990, pp. 48-50.

(Continued)

*Primary Examiner*—Robert Beausoliel
*Assistant Examiner*—Philip Guyton
(74) *Attorney, Agent, or Firm*—Kirschstein, et al.

(57) ABSTRACT

Malicious code in a code-executing device is detected by generating test data, which is substantially unsusceptible to compression without reducing its information content, and storing it as image data in memory external to the device. The test data is stored into memory of the device. A checksum calculation is performed on the test data stored in the memory of the device to generate a first checksum value. A corresponding checksum calculation is performed on the image data to generate a second checksum value. The first value is compared with the second value to determine whether or not the test data in the memory of the device has been corrupted. These steps are repeated until sufficient test data in the memory of the device is checksum tested to determine whether or not malicious code is present in the device. The malicious code is difficult to conceal itself from the checksums. Hence, it is possible to determine whether or not the device has been compromised.

10 Claims, 4 Drawing Sheets

U.S. PATENT DOCUMENTS 5,613,002 A * 3/1997 Kephart et al. ................ 726/24
5,881,151 A * 3/1999 Yamamoto ................... 726/24
5,915,017 A * 6/1999 Sung et al. ................. 713/187

FOREIGN PATENT DOCUMENTS

EP        1 056 010 A1    5/1999

OTHER PUBLICATIONS

Protection Against EEPROM Modification Attacks, W. W. Fung, et al., *Department of Computer Science*, Hong Kong University of Science and Technology Clear Water Bay, Kowloon, Hong Kong, pp. 250-260.

\* cited by examiner

METHOD OF DETECTING MALICIOUS CODE

The present invention is concerned with a method of detecting malicious code in a code-executing device, in particular but not exclusively in a computer. The invention also relates to a test apparatus operating according to the method.

Malicious code, for example computer viruses, frequently causes severe problems in contemporary code-executing systems. Such malicious code can remain dormant after initially being loaded and then, when activated, potentially result in extensive damage to the integrity of data and executable software stored in the systems.

There are presently available a number of techniques for verifying the authenticity of executable code, for example by encrypting the executable code and then decrypting it before use, and by the use of authentication signatures using private or public key cryptography. These techniques are employed to prevent unauthorised executable code being loaded into systems and executed therein. However, if an encryption code or a private key is stolen from its legitimate owner and comes into the possession of a third party, the third party can generate malicious code which will verify correctly against decryption codes and corresponding public keys.

The inventors have appreciated that malicious code gives rise to first and second problems. The first problem is concerned with countermeasures to prevent malicious code being loaded into code-executing systems. The second problem is concerned with determining whether or not a code-executing device loaded with executable code has been compromised where doubt exists regarding the authenticity of the code. For example, in a scenario where it is suspected that malicious code has been loaded into a code-executing system, proceeding to execute the code could wreak costly damage to valuable databases accessible from the code-executing system. Conversely, resetting and subsequently reprogramming the code-executing system could itself be a costly exercise entailing the return of the system to its manufacturer. Moreover, in many circumstances, it will be essential to know whether or not an attempt has been made to distribute malicious code which has passed authentication procedures such as public keys so that other protection measures can be pursued, for example purging devices of malicious code.

The inventors have also appreciated that malicious code can often be constructed in cunning ways to occupy very little memory space in code-executing devices and only use significant internal device memory, or external memory accessible from the device, when the malicious code is active. Trying to detect such malicious code can be very difficult especially when it becomes embedded in seemingly bona fide executable code which, for a majority of the time, appears to be functioning correctly.

Thus, the invention sets out to provide a method of detecting when malicious code has been loaded into code-executing devices.

According to a first aspect of the present invention, there is provided a method of detecting malicious code in a code-executing device, the method characterised in that it includes the steps of:

(a) generating test data which is substantially unsusceptible to compression without reducing its information content and storing it as image data in memory external to the device;

(b) loading the test data into memory of the device;

(c) performing a checksum calculation on the test data stored in the memory of the device to generate a first checksum value, performing a corresponding checksum calculation on the image data to generate a second checksum value, and then comparing the first value with the second value to determine whether or not the test data in the memory of the device has been corrupted;

(d) repeating step (c) until sufficient test data in the memory of the device is checksum tested to determine whether or not malicious code is present in the device.

The method provides the advantage that calculating checksum values for the test data in the memory of the device and comparing with corresponding checksum values calculated for the image data enables malicious code residing in the memory of the device to be detected.

Insusceptibility of the test data to compression prevents any malicious code residing in the memory of the device from concealing its existence by compressing the test data. It is especially preferable that the test data includes one or more random number sequences; random number sequences are by their nature not capable of being compressed without loss of associated information.

Conveniently, the method additionally includes a step of interrogating the device to make it divulge names of software applications stored therein prior to performing step (b) to overwrite the applications in the memory of the device.

When the method has been applied to establish that the device is devoid of malicious code, it is preferable that uncorrupted versions of the software applications divulged by the device are loaded into the device after step (d). Such loading of uncorrupted software enables the device to be returned to its former state prior to applying the method.

In order to make it more difficult for any malicious code residing in the device to predict checksum values required when executing the method, it is beneficial that checksum calculations performed in step (c) are performed on one or more sequences of memory locations of the memory of the device in response to challenges issued to the device, each challenge specifying memory locations of the device to be checksummed using a cryptographic checksum calculation and also one or more associated initialization vectors with which to commence the calculation. Because the malicious code cannot predict the memory locations chosen or the initialization vector used in the method, it is more difficult for the malicious code to pre-compute checksum values and then compress the test data to conceal its presence.

Advantageously, to make it more difficult for the malicious code to conceal itself, the aforementioned one or more sequences may skip memory locations therein. Such location skipping provide the benefit that the memory of the device can be tested in several different ways, thereby making it more difficult for the malicious code to conceal itself.

It is preferable that at least one checksum calculation in step (c) is performed on interfacing software residing in the memory of the device, the interfacing software operable to communicate the test data to the memory of the device and to output data from the memory of the device, the interfacing software also being included in the image data for comparison. Such testing of the interfacing software assists to reduce a risk of malicious code residing therein.

Beneficially, the method makes use of the rapidity with which the device outputs checksum calculations to determine whether or not the memory of the device includes malicious code. If malicious code is present, more processing steps will often be required for the code to conceal its identity from checksum calculations.

Preferably, when testing the device according to the method, the device should be hindered from accessing memory external thereto during calculation of the checksums in step (c). If the device is capable of communicating with such external memory, it is possible for malicious code to conceal its identity by residing in such external memory or, alternatively, to store test data in the external memory to conceal the code's presence within the device.

In step (c), it is preferable that a cryptographic hash algorithm is used for calculating the checksums. Checksums generated by cryptographic hash algorithms are difficult to mimic and hence the use of such algorithms makes it more difficult for malicious code to hide its presence within the device. Examples of suitable cryptographic hash algorithms are:

(a) "MD5" defined in an Internet Engineering Task Force (IETF) document RFC 1321, "The MD5 Message-Digest Algorithm" (1992); and
(b) "SHA-1" defined in National Institute of Standards and Technology (NIST) documents "FIPS Publication 180: Secure Hash Standard (SHS)", (1993) and also in "Announcement of Weakness in the Secure Hash Standard" (1994).

In a second aspect of the invention, there is provided a testing apparatus operable to apply a method according to the first aspect of the invention to interrogate a code-executing device to determine whether or not the device includes malicious code.

Embodiments of the invention will now be described, by way of example only, with reference to the following diagrams in which.

Figure 1:
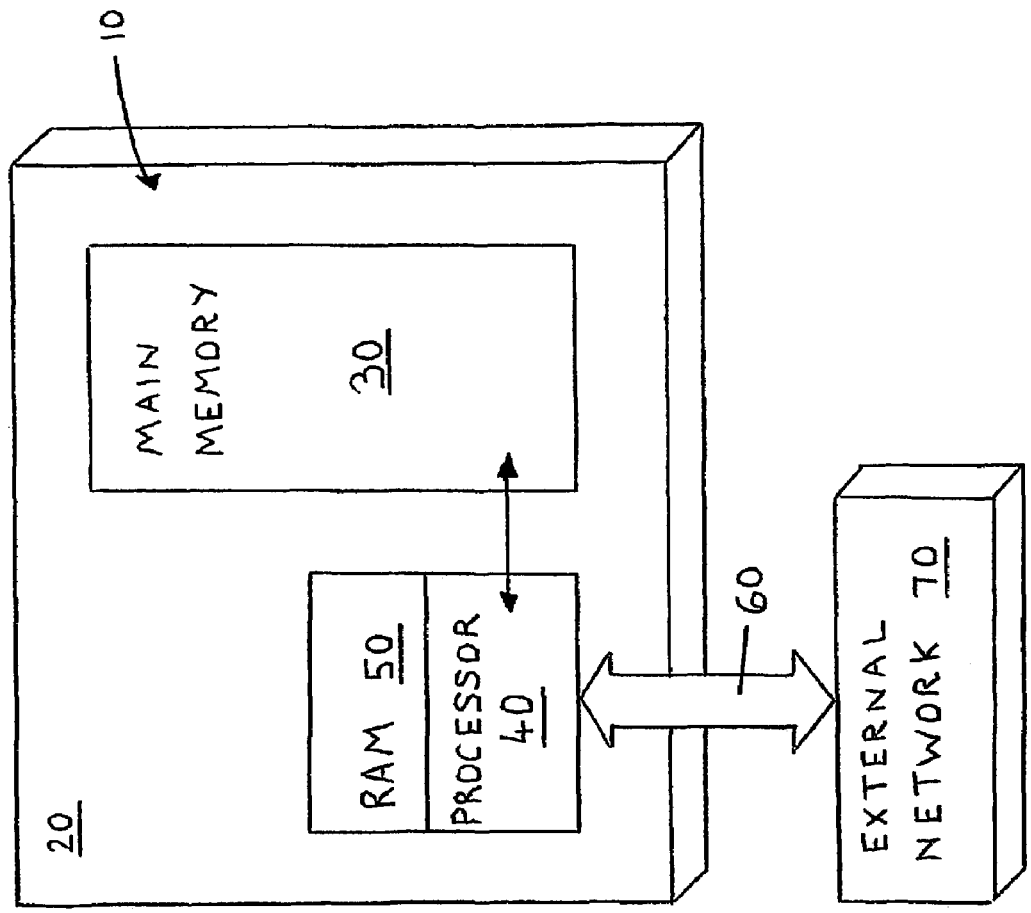
FIG. 1 is a schematic diagram of hardware of a portable code-executing device.

Referring now to FIG. 1, there is shown hardware of a code-executing device indicated by 10. The device 10 includes an enclosure 20, a main memory 30, a code-executing processor 40 and an associated random access memory (RAM) 50. The RAM 50, the processor 40 and the main memory 30 are electrically or optically interconnected such that the processor 40 can access and store data in the RAM 50 and the main memory 30. The device 10 further includes an electrical or optical interface 60 for communicating to a network 70 external to the device 10. The network 70 can, for example, be a testing device or, alternatively, be a network of interconnected computing devices.

When the device 10 is a portable code-executing device, the RAM 50 typically includes 256 bytes of data storage capacity. Moreover, the main memory 30 is typically implemented in the form of an $E^2PROM$ non-volatile memory including 8 Mbytes of data storage capacity. Furthermore, the processor 40 is typically implemented as an 8-bit or 16-bit microcontroller including a bidirectional buffer port providing the interface 60.

The device 10 can also, alternatively, be a large computer where the processor 40 comprises an array of interconnected digital processors, the RAM 50 comprises many Gbytes of solid state data storage capacity, and the main memory 30 includes optical, magnetic and solid state data storage media of many Gbytes storage capacity.

In operation, the external network 70 communicates to the device 10 through the interface 60. When the network 70 sends executable-code to the device 10, the device 10 stores the code in the main memory 30. Additionally, the processor 40 can be instructed to store specific items of data or output specific items of data from its main memory 30, with or without processing applied thereto depending upon circumstances. The main memory 30 is operable to retain data stored therein, for example even in the event of power to the device 10 being removed.

Figure 2:
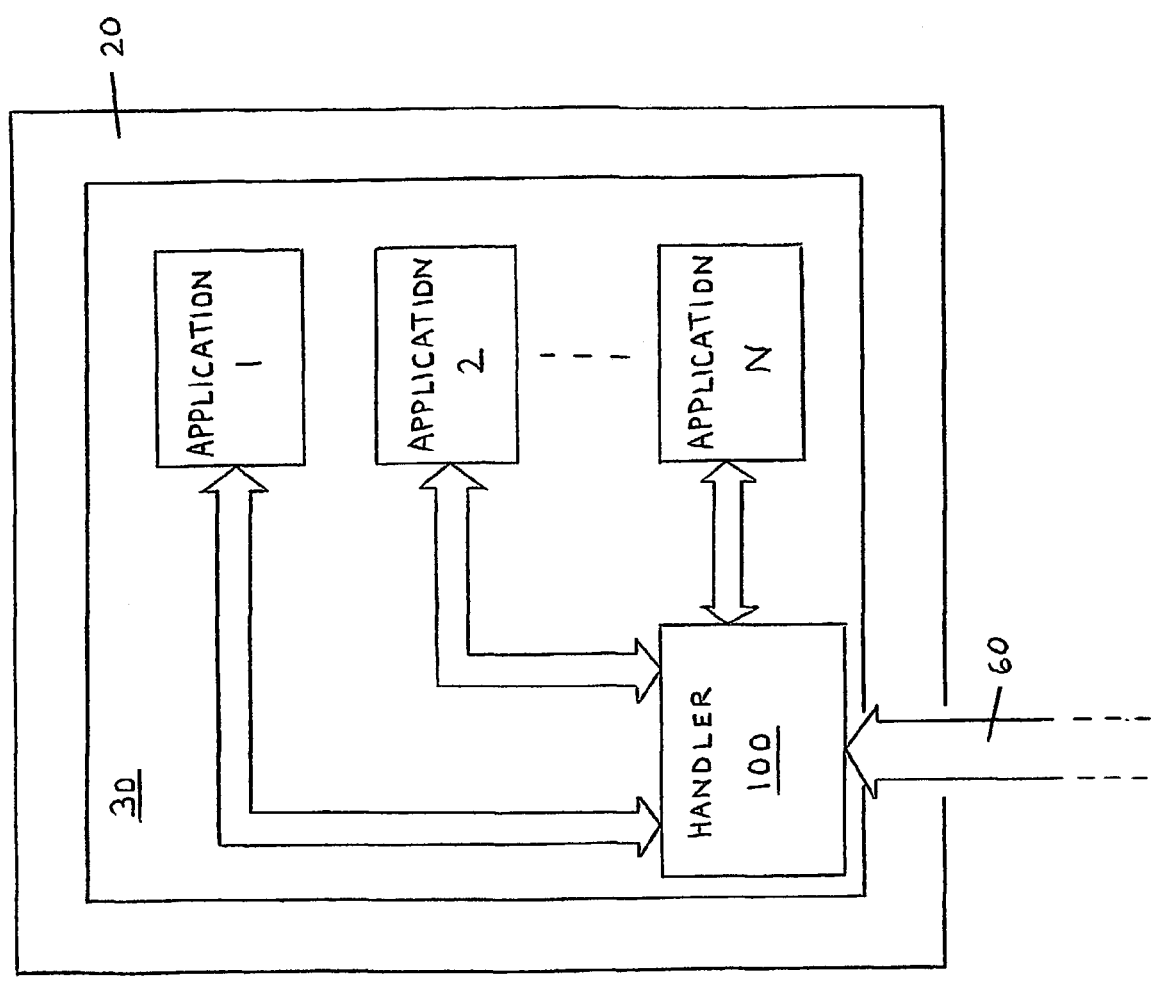
FIG. 2 is an illustration of software applications and a handler loaded into memory of the device in FIG. 1.

The manner in which the device 10 is configured with regard to executable code, namely software, will now be described with reference to FIGS. 1 and 2. Executable code, namely applications 1 to n where n is a positive integer not including zero, is stored in the main memory 30 and loaded into the device 10 through the interface 60 which operates under software control of an executable-code object 100 known as a handler. The handler 100 handles all flow of data and executable code between the network 70 and the main memory 30 and RAM 50.

When the device 10 is operating in conjunction with the network 70, the network 70 can access the main memory 30 via the handler 100. Alternatively, the network 70 can instruct the handler 100 to start execution of one or more of the applications on the processor 40, the handler 100 executing concurrently with the one or more executing applications for handling data flow to and from the device 10.

It is thus only possible for the network 70 to communicate to and from the device 10 via the handler 100 in normal circumstances.

Prior to loading an application into the device 10, the application is signed by its supplying party using the party's private key to ensure its authenticity. The network 70, and also if necessary the handler 100, is then operable to verify the application using a public key corresponding to the private key. Such a procedure of authentication reduces a risk of the device 10 loading into its main memory 30 unauthorised rogue applications.

The use of private and corresponding public key pairs for authenticating software is well known, the keys being in the from of codes. The codes are such that one code of the pair cannot reasonably be generated merely from knowledge of the other code of the pair. When a supplying party supplies a software application to the network 70 for recording into the device 10, the supplying party "signs" the application using one of its keys, the supplying party retaining this key secret as its "private key" which it does not divulge to the network 70. However, the supplying party divulges the other of its keys of the pair to the network 70 and therefrom to the device 10, this being known as the supplying party's "public key". Thus, the public key provided by the supplying party can be used by the network 70 and the device 10 for verifying authenticity of applications signed using the private key belonging to the supplying party.

Generation of private and public keys is known from a U.S. Pat. No. 4,200,770 which is hereby incorporated by reference with regard to the generation of complementary keys. The private and public keys are usually of about 200 bytes in length and can be generated using a mathematical transformation described in the U.S. patent.

Conventional "signing" of software applications using private keys will now be described in further detail.

In a first approach, "signing" involves encoding a software application in its entirety using a private key to generate a corresponding encoded application. The encoded application can be decoded using a corresponding public key to the private key. Other unrelated public keys will not be able to successfully decode the encoded software application to generate viable executable code for use in the device 10. If the handler 100 discovers such non-viable executable code when performing decoding, the handler 100 thereby determines that the executable code is not authentic and should not be executed or retained in the main memory 30.

In a second approach, "signing" involves calculating a cryptographic checksum for a software application using a checksum generation program known to both the supplying party and to the network 70 and the device 10; known cryptographic checksum generating programs include "Message Digest 5" (MD5) and "Secure Hash Algorithm" (SHA or SHA-1). The checksum is relatively short, usually in a range of 16 to 20 bytes in length. The supplying party can use its private key for encoding a checksum generated using a public checksum generation program for its software application and then supply the software application unencoded together with the encoded checksum, sometimes referred to as a Message Authentication Code (MAC), to the network 70 and therefrom to the device 10. When the network 70 receives the software application from the supplying party, the network 70, and likewise the device 10, can apply the public checksum generation program to generate an operator checksum for the unencoded software application. The network 70 and the device 10 can then decode the encoded checksum provided by the supplying party using the supplying party's public key to generate a decoded checksum which the network 70 and the device 10 then compare with their operator checksum. If the decoded checksum is identical to the operator checksum, the network 70 and the device 10 will thereby have determined that the software application is authentic. If the decoded checksum and the operator checksum are not identical, the network 70 and the device 10 will have identified that the software application is suspect.

The second approach to "signing" software applications is faster and involves less computation than the first approach because checksum generation is a computationally quick operation to perform and encoding a checksum of 16 to 20 bytes is easier than encoding software and data in its entirety which can be, for example, several tens of Megabytes in size.

When the term "signing" is used by the inventors to describe their invention, this is intended to refer to either signing by the first approach or signing according to the second approach as described above.

A problem can arise where a private key of a software application supplying party to the network 70, and therefrom to the device 10, is stolen by a third party. The third party is then able to prepare malicious code and sign it using the private key and supply the malicious code as a software application to the network 70. Neither the network 70 nor the device 10 when checking the application for authenticity using their corresponding public key will be able to detect the malicious code.

If it subsequently becomes known that the private key has been stolen, software applications signed by the private key then become suspect as being malicious code. There then arises a problem of how to test the device 10 to determine whether or not its one or more software applications stored in its main memory 30 include malicious code.

When malicious code is loaded via the interface 60 and processor 40 into the device, the code can be stored in a number of ways, namely:

(a) the malicious code can overwrite the handler 100, or co-exist therewith in the main memory 30, and function as a rogue handler mimicking the operation of the handler 100 but also performing functions to the benefit of the third party, for example transferring money from a bank account of a legitimate owner of the device 10 into a bank account held by the third party;

(b) the malicious code can be stored as a software application and invocable from the network 70 by way of the handler 100, the software application operable to perform an unauthorised function to the detriment of the owner of the device 10; and (c) the malicious code can be stored as data which is operated upon by bona fide applications and the handler 100 stored in the main memory 30, the data resulting in an unauthorised function being performed.

When the handler 100 is replaced by a malicious handler, the malicious handler is capable of concealing the presence of one or more third party malicious applications stored in the memory 30 when interrogated through the interface 60 from the network 70. In such a situation, the device 10 will appear to be functioning correctly from the viewpoint of the network 70. Continued use of the device 10 could result, for example, in expensive corruption of the network 70 and its associated databases. There is therefore a need for a method of detecting when suspect malicious code has been loaded into the device 10, especially when private-public key authorisation procedures have been circumvented by the theft of private keys.

Figure 3:
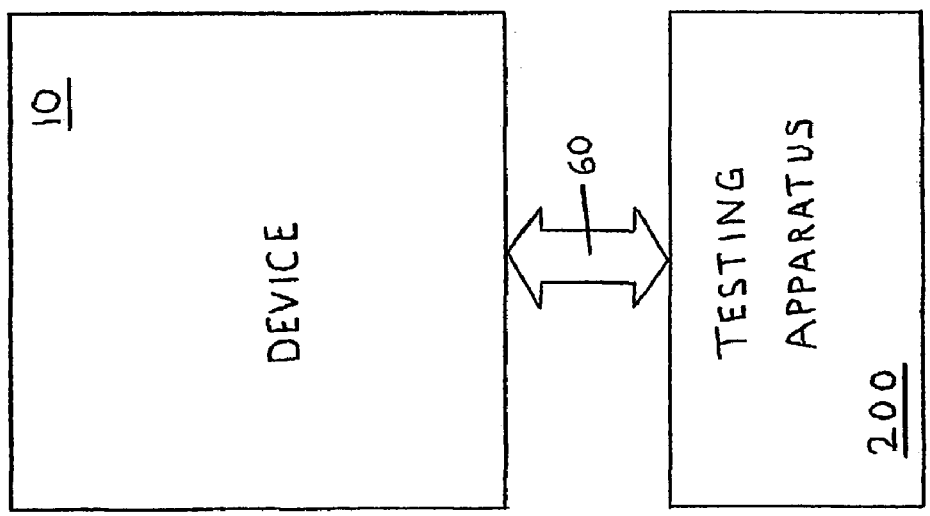
FIG. 3 is an illustration of the device shown in FIGS. 1 and 2 connected to a testing apparatus according to the invention.
Figure 4:
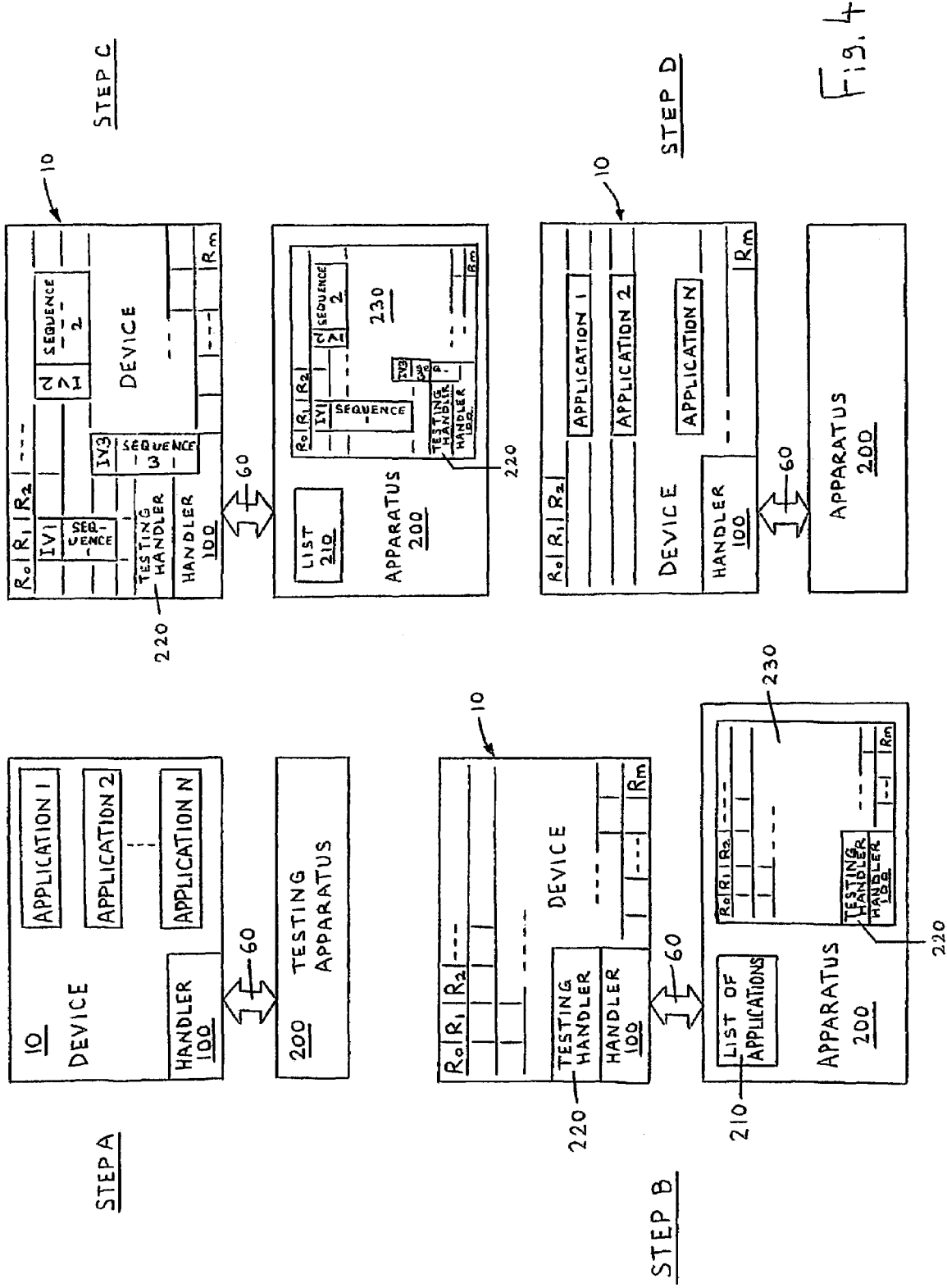
FIG. 4 is a diagram in which is shown steps of a method of detecting when malicious code has been loaded into the device in FIGS. 1 to 3.

A method according to the invention of detecting when malicious code has been loaded into the device 10 will now be described with reference to FIGS. 3 and 4. In FIG. 3, the device 10 is shown in a configuration connected through the interface 60 to a testing apparatus 200. In the configuration, the device 10 is deliberately arranged so that it is only capable of communicating with the apparatus 200. Such a restricted communication is used to prevent malicious code present it the device 10 from communicating with other devices or using memory external to the device for concealing itself from the apparatus 200.

In STEP A of the method, the device 10 including its handler 100 and its one or more software applications are connected to the apparatus 200. The apparatus 200 then communicates through the interface 60 to the handler 100 and requests it to divulge a list 210 of applications stored within it. In some circumstances, the network 70 will itself keep a record of applications that have been loaded into the device 10; however, such a record is not essential for performing the method of the invention. The handler 100 thus responds to the apparatus 200 by communicating the list 210 of the applications stored in the device 10.

If the handler 100 has been corrupted to become a malicious handler, it could lie to the apparatus 200 and conceal the presence of one or more rogue applications stored in the device 10 as well as bona fide applications.

When the apparatus 200 has received the list 210 from the handler 100, the apparatus 200 stores the list 210 in its own memory.

In STEP B of the method, the apparatus 200 transmits through the interface 60 a software application known as a testing handler 220 to the device 10 which stores it in specific locations of its main memory 30. At this stage, the device 10 should only include its handler 100, the testing handler 220 and any applications that the device has declared in the list 210 to the apparatus 200.

If the device 10 has been compromised by malicious code, it may include applications not declared in the list 210 to the apparatus 200 and the handler 100 itself may comprise malicious code.

If the network 70 has its own list of applications that should be stored in the device 10 and this network 70 list is not in conformity with the list 210, the apparatus 200 will thereby determine therefrom that the device 10 has been compromised by inclusion of presumed malicious additional code.

The apparatus 200 then proceeds to instruct the device 10 to run the testing handler 220. Moreover, the apparatus 200 will know in advance which main memory 30 locations the handler 100 and the testing handler 220 should occupy. Memory 30 locations not occupied by these handlers 100, 220 should therefore be available for storing software applications.

The apparatus 200 then generates a reference image 230 within its memory of how the main memory 30 of the device 10 should appear. Following the generation of the reference image 230, the apparatus 200 generates a sequence of random numbers $R_0$ to $R_m$ and fills locations of the reference image 230 not occupied by the handlers 100, 220 with the random numbers. The apparatus 200 also passes these random numbers through the interface 60 to the testing handler instructing it to store the random numbers in locations in the main memory 30 corresponding to those of the reference image 230.

Random numbers have the characteristic that they cannot be compressed without losing information content. Thus, if rogue applications are stored in the main memory 30 of the device 10, and the handler 100 is a malicious handler, the malicious handler cannot compress the random numbers to conceal the presence of rogue applications because, as will be described later, such attempts at compressing the random numbers can be detected by the apparatus 200.

The apparatus 200 continues to supply the random numbers to the device 10 via the testing handler 210 until all locations of the main memory 30 are filled except for those locations occupied by the handlers 100, 220.

In STEP C of the method, the apparatus 200 uses a procedure involving initialization vectors (IV) to interrogate the device 10 to test whether or not the random numbers $R_0$ to $R_m$ have been correctly recorded in the main memory 30. If incorrect recording of the numbers is identified, such incorrect recording is indicative of the action of a rogue application or that the handler 100 has been compromised.

When interrogating the device 10, the apparatus 200 sends a challenge via the interface 60 to the testing handler 220. The challenge specifies a sequence of start locations within the main memory 30 and an initialisation vector (IV). The testing handler 220 then initializes its cryptographic hash algorithm with the supplied IV before feeding the contents of the sequence of specified locations in turn to this algorithm. The algorithm of the testing handler 220 calculates a resulting first checksum which is typically in the order of 128 or 160 bits in length. The testing handler 220 then, using an identical IV and an identical cryptographic hash algorithm to that supplied to the testing handler 220, calculates a corresponding second checksum based on data stored in the reference image 230. If the first and second checksums are not identical, the apparatus 200 determines thereby that the device 10 has been compromised. Conversely, if the first and second checksums are identical, the apparatus 200 interrogates the device 10 using other challenges. If necessary, the apparatus 200 can interrogate the whole of the main memory 30 include locations occupied by one or more of the handler 100 and the testing handler 220. If the handler 100 has been compromised to be a malicious handler, the apparatus 200 will be able to detect such a compromise.

The apparatus 200 preferably interrogates the device 10 using numerous different initialization vectors and, if necessary, also specifies sequences of varying lengths for use in calculating associated checksums. Such multiple interrogation is effective to prevent a malicious handler in the device attempting to pre-compute checksums and then compress the random numbers as they are supplied to the device 10 in order to try to conceal the presence of rogue applications.

The sequences preferably include locations occupied by at least one the handler 100 and the testing handler 220. Moreover, the sequences can optionally alternately skip one or more locations to make it more difficult for malicious code to conceal itself within the device 10. Such skipping is illustrated by Sequences 1 and 3 in FIG. 4. Sequence 2 in FIG. 4 corresponds to consecutive memory locations in the main memory 30. Sequence 3 includes locations occupied by the handlers 100, 220.

If, after interrogating the device 10 with numerous mutually different initialization vectors, it is determined that the device 10 has not been compromised, the method proceeds to STEP D. If the device 10 has been compromised, an alarm is raised.

In STEP D of the method, the apparatus 200 optionally overwrites the testing handler 220 stored in the device 10 to prevent the executable code of this handler 220 being subsequently disclosed to an application subsequently executing on the device 10, and then proceeds to load bona fide approved versions of applications as recorded in the list 210. Such loading results in the device 10 including an uncompromised version of the handler 100, one or more bona fide applications with remaining locations in the main memory 30 being filled with random numbers. The apparatus can, if required, optionally purge the memory 30 of random numbers prior to loading the one or more bona fide applications.

The method provides the benefit that the presence of malicious code within the device 10 can be detected even if applications signed by a stolen private key corresponding to a public key stored in the device 10 have been loaded into the device 10. Moreover, the method also enables bona fide uncompromised applications to be reloaded into the device 10 at termination of the method thereby rendering the device 10 again useable.

The method of the invention will not be able to detect all possible malicious code. For example, where malicious code is capable of operating upon the handler 100 in uncompromised form, compressing it and then storing the compressed handler and the malicious code in memory space originally occupied by the uncompressed handler 100, the method can be circumvented. However, the malicious code would have to be capable of interfacing with the testing handler to provide it with sequences of location values normally occupied by the uncompressed handler 100 when tested during Step C of the method. The testing apparatus 200 could, if necessary, be made sensitive to such compression by timing interrogation response from the device 10; uncompressing code will take more time hence malicious code operating in such a manner can be detected by virtue of its slower than normal response.

It will be appreciated as described above that the device 10 can take many different forms. The aforementioned method of the invention is applicable to both where the device 10 is a portable personal item as well as where it is a complex computer installation.

It will also be appreciated to those skilled in the art that modifications can be made to the method of the invention without departing from the scope of the invention. For example, in Step B, the main memory 30 of the device 10 can be filled with alternative data other than random numbers provided that the alternative data is not susceptible to being undetectably compressed by any malicious code that may be present in the device 10; compression of the alternative data would potentially provide the malicious code with memory space to continue its existence. Moreover, in Step C, the sequences of locations read for generating the checksums need not necessarily map out the main memory 30 in its entirety if a less thorough interrogation of the device 10 is acceptable. Furthermore, although use of a cryptographic hash algorithm for generating the checksums in Step C is described, other approaches for generating checksums can alternatively be used in combination with or in substitution for the cryptographic hash algorithm.

Although loading of the testing handler 220 into the device 10 is described, it is feasible for the handler 100 itself to be adapted so as to be capable of loading random numbers supplied from the testing device 200 into the main memory 30 in Step B, thereby circumventing a need for the testing handler 220 to be loaded into the device 10.

The invention claimed is:

1. A method of detecting malicious code in a code-executing device, the method comprising the steps of:
   a) generating test data, which is substantially unsusceptible to compression without reducing its information content, and storing the test data as image data in memory external to the device;
   b) storing the test data into memory of the device;
   c) performing a checksum calculation on the test data stored in the memory of the device to generate a first checksum value, performing a corresponding checksum calculation on the image data to generate a second checksum value, and then comparing the first value with the second value to determine whether the test data stored in the memory of the device has been corrupted;
   d) hindering the device from accessing memory external thereto during calculation of the checksums; and
   e) repeating step c) until sufficient test data stored in the memory of the device is checksum tested to determine whether malicious code is present in the device.

2. The method according to claim 1, and the step of interrogating the device to make the device divulge names of software applications stored therein prior to performing step b) to overwrite the applications in the memory of the device.

3. The method according to claim 2, wherein uncorrupted versions of the software applications divulged by the device are loaded into the device after step e) when the device is found to be devoid of malicious code.

4. The method according to claim 1, wherein the test data includes at least one random number sequence.

5. The method according to claim 1, wherein the checksum calculations performed in step c) are performed on at least one sequence of memory locations of the memory of the device using challenges to specify the memory locations and to specify at least one initialization vector to be used in the checksum calculations.

6. The method according to claim 5, wherein the at least one sequence skips memory locations therein.

7. The method according to claim 1, wherein at least one checksum calculation in step c) is performed on interfacing software residing in the memory of the device, the interfacing software being operable to communicate the test data to the memory of the device and to output data for the memory of the device, the interfacing software also being included in the image data for comparison.

8. The method according to claim 1, wherein a speed with which the device outputs checksum calculations is used to determine whether the memory of the device includes malicious code.

9. The method according to claim 1, wherein a cryptographic hash algorithm is used for calculating the checksums.

10. A testing apparatus for detecting malicious code in a code-executing device, the apparatus comprising:
   a) means for generating test data, which is substantially unsusceptible to compression without reducing its information content, and for storing the test data as image data in memory external to the device;
   b) means for storing the test data into memory of the device;
   c) means for performing a checksum calculation on the test data stored in the memory of the device to generate a first checksum value, for performing a corresponding checksum calculation on the image data to generate a second checksum value, and then for comparing the first value with the second value to determine whether the test data stored in the memory of the device has been corrupted, the device being hindered from accessing memory external thereto during calculation of the checksums; and
   d) means for repeating the checksum calculations and comparison until sufficient test data stored in the memory of the device is checksum tested to determine whether malicious code is present in the device.

* * * * *